United States Patent

Jiang et al.

[11] Patent Number: 6,134,045
[45] Date of Patent: Oct. 17, 2000

[54] CHITOSAN OPTICAL MATERIALS

[75] Inventors: Hao Jiang; Weijie Su, both of Dayton; Thomas M. Cooper, Miamisburg, all of Ohio

[73] Assignee: The United States of America as represented by the Secretary of the Air Force, Washington, D.C.

[21] Appl. No.: 09/118,301

[22] Filed: Jul. 17, 1998

Related U.S. Application Data

[60] Provisional application No. 60/052,943, Jul. 17, 1997.

[51] Int. Cl.$^7$ .................... G02B 1/04; G02B 5/22
[52] U.S. Cl. .................... 359/321; 359/245; 359/297; 359/589; 359/601; 359/885
[58] Field of Search .................... 359/245, 321, 359/577, 580, 589, 601, 885, 297; 385/122, 123, 129, 130, 141, 145, 144

[56] References Cited

U.S. PATENT DOCUMENTS

| | | | |
|---|---|---|---|
| 4,386,151 | 5/1983 | Berger et al. | 430/228 |
| 4,798,694 | 1/1989 | Sugata et al. | 264/60 |
| 5,045,227 | 9/1991 | Hatakeyama et al. | 252/299.5 |
| 5,165,973 | 11/1992 | Kojima et al. | 428/331 |
| 5,213,887 | 5/1993 | Huffman | 428/323 |
| 5,322,760 | 6/1994 | Itoh et al. | 430/270 |
| 5,330,823 | 7/1994 | Malhotra | 428/195 |
| 5,805,326 | 9/1998 | Snow et al. | 359/241 |
| 5,815,330 | 9/1998 | Becker | 359/886 |
| 5,862,286 | 1/1999 | Imanishi et al. | 385/122 |

FOREIGN PATENT DOCUMENTS

| | | |
|---|---|---|
| 1-147431 | 6/1989 | Japan . |
| 5-019123 | 1/1993 | Japan . |
| 06-102547 | 4/1994 | Japan . |

OTHER PUBLICATIONS

Jang et al., "Optical waveguiding and morphology of Chitosan Thin Films," Journal of Applied Polymer Science, vol. 61, No. 7, Aug. 15, 1996, pp. 1163–1171.

Mark et al. (Editor), Encyclopedia Of Polymer Science And Engineering, vol. 3, (Wiley & Sons, New York) c., pp. 430–441, Jun. 1985.

Thomas M. Cooper, et al., "Formation of Polypeptide–dye Multilayers by an Electrostatic Self–assembly Technique," Langmuir, Jul., 1995, vol. 11, pp. 2713–2718, describes an electrostatic self–assembly method for making polypeptide–dye multilayers.

Primary Examiner—Hung Xuan Dang
Assistant Examiner—Margaret Burke
Attorney, Agent, or Firm—Fredric L. Sinder; Thomas L. Kundert

[57] ABSTRACT

Chitosan-based electro-optic elements are disclosed. An optical waveguide is made from films of chitosan-acetic acid, and from films of chitosan-acetic acid doped with various rare-earth metal ions, over a substrate. Optical limiters are made from chitosan gel host materials doped with a variety of photo-interactive or light limiting dopants. Three different suitable example chitosan gel hosts are disclosed. An electrostatically self-assembling multilayer film is made with a chitosan base layer.

33 Claims, 2 Drawing Sheets

CHITOSAN OPTICAL MATERIALS

CROSS-REFERENCE TO RELATED APPLICATIONS

This application claims priority under 35 U.S.C. § 119(e) from U.S. provisional application No. 60/052,943, filed Jul., 17, 1997, by applicants Hao Jiang, Weijie Su and Thomas M. Cooper, entitled Chitosan Optical Materials. The invention description contained in that provisional application is incorporated by reference into this description.

This application is related to U.S. application Ser. No. 09/058,126, filed Apr. 10, 1998, by applicants Daniel G. McLean et al., entitled "Damage Resistant Gel Optical Materials." The invention description contained in that application is incorporated by reference into this description.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to the use of chitosan as an optical material, and more specifically to the use of chitosan and its derivatives as optical elements for electro-optic applications.

Holographic, diffractive and waveguiding optical elements have an important role in optical information processing, display and optical filtering applications. These applications require optically clear, low loss optical matrices.

A particularly important use for new optical elements is for optical limiters. Optical limiters are generally transparent optical elements that block, or limit to a maximum intensity, the transmission of incident light at specific wavelengths. A primary use for optical limiters will be for protection against laser radiation.

In recent years, substantial research has been conducted on using organic and polymeric materials as optical elements. While polymeric materials have exhibited relatively low optical loss at important communication wavelengths of 830 nm, 1.3 $\mu$m and 1.5 $\mu$m, favorable processing compatibility with microelectronic and optical devices and a wide variety of useful special properties such as refractive index tailoring, barriers still exist to producing successful new materials with combined needed attributes of, for example, low propagation loss, high temperature stability and excellent electronic packaging process capability.

Chitosan is a polysaccharide easily derived from chitin by N-deacetylation. Chitin is widely found in nature as a major component of the cell wall of various fungi and in the shells of insects and crustaceans. In recent decades, chitosan has received much attention for its special properties and inexpensive, abundant availability. Research has not only been concentrated in traditional areas such as waste water treatment and medical fibers and films, but also for potential applications in many other areas including industry, agriculture, food and biology. Contact lenses have been made from aminopolysaccharide compounds derived from chitosan.

Despite a need for new optical materials having new and improved properties suitable for use in newer optical elements, prior art investigation of organic and polymeric materials for new uses and research studying chitosan for a variety of new uses, have not included the possibility of using chitosan or a derivative as an optical element for a electro-optic application.

It is, therefore, a principal object of the present invention to provide optical elements made from chitosan and its derivatives for use in electro-optical applications.

It is another object of the present invention to provide optical waveguiding materials made from chitosan films.

It a further object of the present invention to provide chitosan gel systems as host materials for optical limiters.

It is a feature of the present invention that chitosan has a high affinity for dyes.

It is another feature of the present invention that chitosan has active amine groups which can be protonated to ammonium ($NH_3^+$) groups to create an inherent positive electrostatic charge.

It is a further feature of the chitosan that it has high optical clarity and exhibits low loss over a broad band of wavelengths.

It is still another feature of the present invention that chitosan has a high laser damage threshold.

It is a still further feature of the present invention that chitosan is stable to heat, light, moisture and many chemicals.

It is yet another feature of the present invention that chitosan has a high decomposition temperature.

It is a yet further feature of the present invention that chitosan has a high ability to absorb metal cations.

It is an advantage of the present invention that chitosan is widely and inexpensively available.

It is another advantage of the present invention that chitosan has excellent processability to form films, coating materials and fibers.

These and other objects, features and advantages of the present invention will become apparent as the description of certain representative embodiments proceeds.

SUMMARY OF THE INVENTION

In accordance with the foregoing principles and objects of the present invention, several novel chitosan-based optical materials and elements are described. The unique discovery of the present invention is new and useful electro-optic materials made from chitosan and its derivatives. Particularly, a new waveguide material can be made from a chitosan-acetic acid solution and from such a solution doped with rare-earth metal ions; new gel host matrix materials for optical limiters can be made from a chitosan/acetic acid anhydride gel, from a chitosan/glutaraldehyde gel and from an acrylate/chitosan system; and, a electrostatic self-assembling multilayer film can be made with a chitosan base layer.

Accordingly, the present invention is directed to an electro-optical apparatus comprising a substrate and a rare-earth metal ion doped chitosan-acetic acid film over the substrate.

The present invention is still also directed to an optical limiter, comprising a chitosan gel host material and a photo-interactive dopant inside the chitosan gel host material. The chitosan gel host material may comprise a chitosan/acetic anhydride gel. The chitosan gel host material may comprise a chitosan/glutaraldehyde gel. The chitosan gel host material may comprise an acrylate/chitosan system. The photo-interactive dopant may comprise tetramethyl pyridinyl porphyrin. The photo-interactive dopant may comprise a water soluble Zn-octabromotetraphenyl porphyrin. The photo-interactive dopant may also comprise copper (II) phthalocyanine tetrasulfonic acid, tetrasodium salt.

The present invention is still further directed to an optical limiter, comprising a substrate, a chitosan layer over the substrate, a first negatively charged layer over the chitosan layer and a first positively charged layer over the first negatively charged layer. The optical limiter may further comprise a plurality of successive layers of alternating positively charged layers and negatively charged layers over the first negatively charged layer. The first negatively charged layer may be a layer of sulfonated $C_{60}$ and the first positively charged layer may be a layer of tetramethyl pyridinyl porphyrin. The optical limiter may further comprise a plurality of successive layers of alternating sulfonated $C_{60}$ and tetramethyl pyridinyl porphyrin over the first layer of tetramethyl pyridinyl porphyrin. The first negatively charged layer may be a layer of copper (II) phthalocyanine and the first positively charged layer may be a layer of tetramethyl pyridinyl porphyrin. The optical limiter may further comprise a plurality of successive layers of alternating copper (II) phthalocyanine and tetramethyl pyridinyl porphyrin over the first layer of tetramethyl pyridinyl porphyrin.

The present invention is yet also directed to a method for making an electro-optic apparatus, comprising the steps of providing a substrate and coating the substrate with a chitosan-acetic acid film doped with rare-earth metal ions.

The present invention is still yet also directed to a method for making an optical limiter, comprising the steps of providing a chitosan host material and doping the chitosan host material with a photo-interactive dopant.

The present invention is still yet further directed to a method for making an optical limiter, comprising the steps of providing a chitosan gel host material and doping the chitosan gel host material with a photo-interactive dopant. The chitosan gel host material may comprise a chitosan/acetic anhydride gel. The chitosan gel host material may also comprise a chitosan/glutaraldehyde gel. The chitosan gel host material may comprise an acrylate/chitosan system. The photo-interactive dopant may comprise tetramethyl pyridinyl porphyrin. The photo-interactive dopant may also comprise a water soluble Zn-octabromotetraphenyl porphyrin. The photo-interactive dopant may also comprise copper (II) phthalocyaninetetrasulfonic acid, tetrasodium salt.

The present invention is also directed to a method for making an optical limiter, comprising the steps of providing a substrate, coating the substrate with layer of chitosan, electrostatically coating the chitosan layer with a first negatively charged layer and electrostatically coating the first negatively charged layer with a first positively charged layer. The method may further comprise the steps of electrostatically applying a plurality of successive layers of alternating positively charged layers and negatively charged layers over the first negatively charged layer. The first negatively charged layer may be a layer of sulfonated $C_{60}$ and the first positively charged layer may be a layer of tetramethyl pyridinyl porphyrin. The method may further comprise the steps of electrostatically applying a plurality of successive layers of alternating sulfonated $C_{60}$ and tetramethyl pyridinyl porphyrin over the first layer of tetramethyl pyridinyl porphyrin. The first negatively charged layer may be a layer of copper (II) phthalocyanine and the first positively charged layer may be a layer of tetramethyl pyridinyl porphyrin. The method may further comprise the steps of electrostatically applying a plurality of successive layers of alternating copper (II) phthalocyanine and tetramethyl pyridinyl porphyrin over the first layer of tetramethyl pyridinyl porphyrin.

The present invention is further directed to a method for limiting the transmission of a beam of electromagnetic energy comprising intercepting the beam by a chitosan host material having a photo-interactive dopant inside the chitosan host material.

The present invention is still also directed to a method for limiting the transmission of a beam of electromagnetic energy comprising intercepting the beam by a chitosan gel host material having a photo-interactive dopant inside the chitosan gel host material.

The present invention is yet also directed to a method for limiting the transmission of a beam of electromagnetic energy comprising intercepting the beam by an optical limiter comprising a substrate, a chitosan layer over the substrate, a first negatively charged layer over the chitosan layer and a first positively charged layer over the first negatively charged layer.

BRIEF DESCRIPTION OF THE DRAWINGS

The present invention will be more clearly understood from a reading of the following detailed description in conjunction with the accompanying drawings wherein.

DETAILED DESCRIPTION

Figure 1:
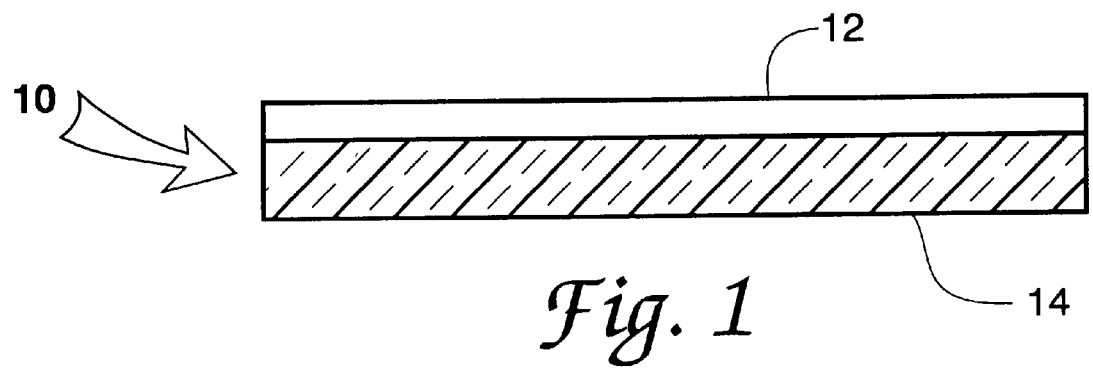
FIG. 1 is a schematic representation of an optical waveguide made according to the teachings of the present invention showing a chitosan film over a substrate.

Referring now to FIG. 1 of the drawings, there is shown a schematic representation of an optical waveguide 10 made according to the teachings of the present invention. Optical waveguide 10 comprises a chitosan thin film 12 over a substrate 14.

The chitosan used for making films such as thin film 12 was supplied by Fluka, with either low molecular weight (MW approximately 70,000) or medium molecular weight (MW approximately 750,000). The chitosan was dissolved in an acetic acid ("HAc") aqueous solution (0.5–10 wt. %) to form a precursor solution with 0.5–5 wt. % chitosan. Optionally, the chitosan solutions were doped with rare-earth metal ions, two examples of which were $Nd^{3+}$ [$Nd(No_3)_3$] and $Er^{3+}$ [$ErCl_3$]. Doping ratios around 5–50 wt. % relative to chitosan were used. The precursor solution was carefully filtered though a medium grade glass sinter filter. The films were prepared by spin-coating (at spinning rates of 30–250 rpm) or casting the precursor solution on silicon, $SiO_2$/silicon, quartz glass or polyethylene substrates at room temperature. The films were immediately dried in a vacuum chamber at 55° C. for 4 hours. The thickness of the prepared films ranged from 0.3 to 10 microns.

A more detailed description of an optical waveguide material made according to the teachings of the present invention may be found in Hao Jiang, et al., "Optical Waveguiding and Morphology of Chitosan Thin Films," *Journal of Applied Polymer Science*, vol. 61, pp. 1163–1171 (1996), which is incorporated by reference into this description.

Figure 2:
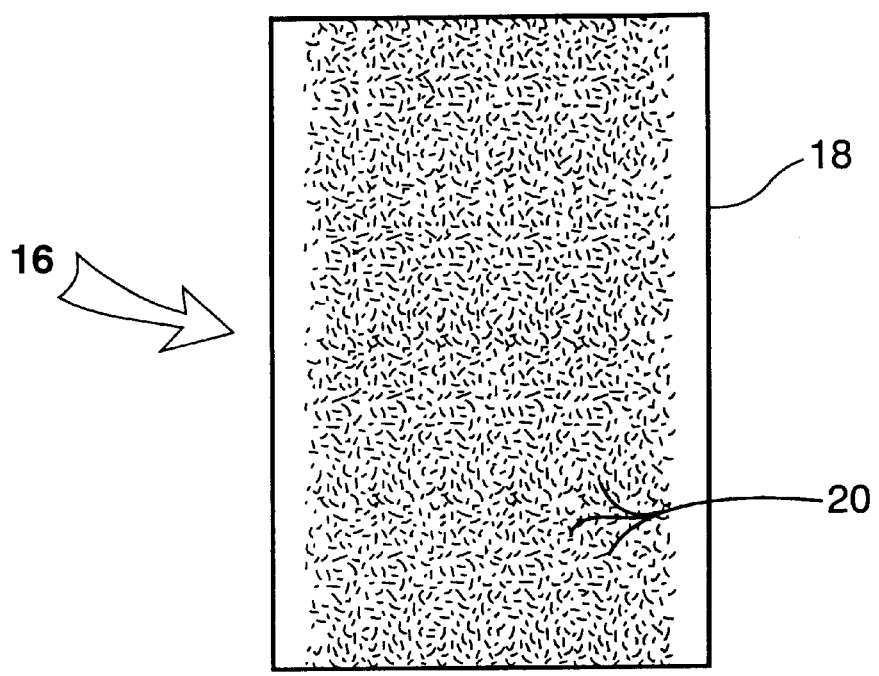
FIG. 2 is a schematic representation of an optical limiter made according to the teachings of the present invention showing a chitosan gel host material matrix containing an photo-interactive dopant; and, FIG. 3 is a schematic representation of a multilayer optical limiter showing a base chitosan layer overlaid with alternating layers of sulfonated $C_{60}$ and tetramethyl pyridinyl porphyrin.

FIG. 2 shows an optical limiter 16 made of a chitosan gel host material 18 doped with a photo-interactive chromophore 20. Photo-interactive is intended to refer to dopants that interact with light in some manner to limit or affect the transmission of light through an optical limiter, or any other optical element. This interaction may be based on a variety of different physical processes, such as scattering, absorption or reflection.

Three kinds of chitosan gel host materials 18 have been prepared—a chitosan/acetic anhydride gel, a chitosan/glutaraldehyde gel and an acrylate/chitosan system. Low molecular weight chitosan (MW approximately 70,000) was purchased from Fluka and used without further purification. Two different cross-linking agents were used, acetic anhydride available from Aldrich and glutaric dialdehyde available from Polysciences. Three different chromophores were used as photo-interactive or light limiting dopants, tetramethyl pyridinyl porphyrin ("porphyrin"), a water soluble version of Zn-octabromotetraphyenyl porphyrin ("ZnOBP") and copper (II) phthalocyanine tetrasulfonic acid, tetrasodium salt ("CuPc").

The general procedure for preparation of chitosan/acetic anhydride gels is as follows. Chitosan was dissolved with stirring into a 10% acetic acid ("HAc") aqueous solution to form a 2 wt. % chitosan/HAc solution at room temperature. The chitosan solution was stirred overnight. The solution was then filtered through a glass sinter (coarse grade) to remove insoluble impurities. Methanol was added with stirring into the chitosan solution. The volume ratio of methanol to chitosan solution was between 1:2 to 1:10 depending on requirements. The solution was stirred for 1 hour. Acetic anhydride was gradually added into the solution while carefully stirring the solution. The volume ratio of the chitosan/methanol solution to acetic anhydride was varied from 20:1 to 100:1. The chromophores were added to the methanol just before mixing with chitosan in the fabrication of the optical limiters.

For the chitosan/glutaraldehyde gel system, chitosan was dissolved in a 2% HAc solution to form a 2wt. % chitosan/HAc solution (with the same procedure as for the chitosan/anhydride gel system). An 8% glutaraldehyde aqueous solution was carefully added to the chitosan solution to form a gel. The volume ratio of the chitosan solution to the glutaraldehyde solution was from 1:1 to 5:1. For optical limiters, chromophores were mixed with the glutaraldehyde solution just before dropping into the chitosan solutions.

For the acrylate/chitosan system, also referred to as a modified chitosan system, chitosan was dissolved into 0.5% HAc solution to form 2 wt. % chitosan/HAc solution (with the same procedure as previously described). To form the gel, 2 to 5 ml 2-hydroxyethyl acrylate (96% from Aldrich), was first mixed with 30 to 100 mg N-N'-methylene bisacrylamide, a cross-linking agent available from Aldrich at 99%. With stirring, 3 to 20 ml water and 2.5 to 5 mg VA44 (an initiator from Wako) were added into the mixing solution. The solution was put in a water bath with the temperature controlled at 50 to 70° C. depending on requirements. Then, 1 to 5 gm 2% chitosan solution and 10 to 50 $\mu$l (0.1% GD water solution) were added into the mixed solution.

A more detailed description of optical limiters made using chitosan-based materials according to the teachings of the present invention may be found in Hao Jiang et al., "Chitosan Gel Systems as Novel Host Materials for Optical Limiters." *Mat. Res. Soc. Symp. Proc.*, vol. 479, pp. 129–134 (1997), which is incorporated by reference into this description. More information may also be found in Mark C. Brant et al., "*Guest-Host Optical Limiters with High Laser Damage Threshold*," SPIE Proceedings, vol. 2966, pp. 88–95 (1997), which is incorporated by reference into this description.

Figure 3:
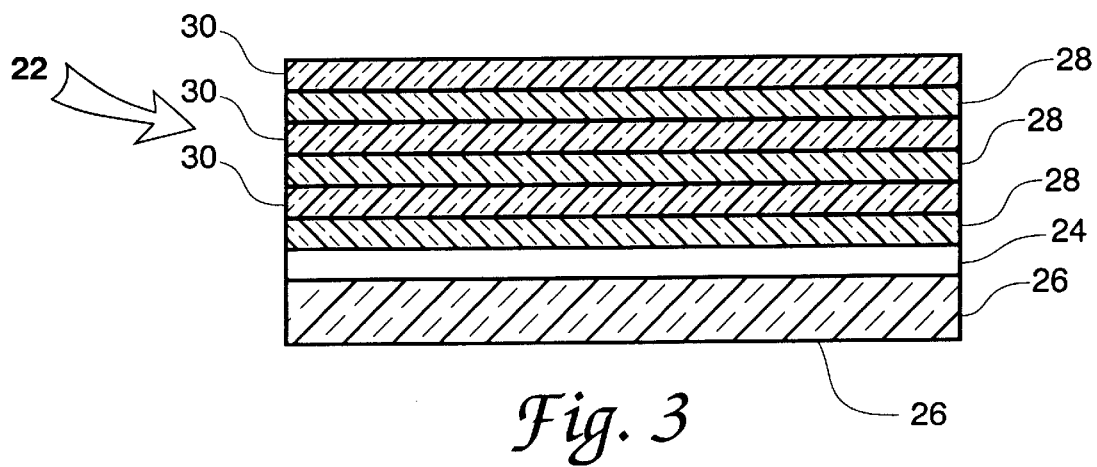

FIG. 3 shows a multilayer optical limiter 22 with a base chitosan surface layer 24 over a substrate 26. Alternating sulfonated $C_{60}$ layers 28 and tetramethyl pyridinyl porphyrin ("TMePyP") layers 30, typically monolayers, are stacked over chitosan layer 24. Multilayer optical limiter 22 is an electrostatically self-assembling multilayer film. Layer 28 may also be a layer of copper (II) phthalocyanine ("CuPc", or "CuPc(SO$_3$Na)$_4$" or "CuPcTSA" to indicate a water soluble form). Chitosan, with its positively charged ammonium groups (NH$_3^+$), can form electrostatic complexes with chromophores. Using chitosan as a base host material with chromophores prepared from CuPc(SO$_3$Na)$_4$ solves a prior art a prior art precipitation problem with CuPc-TMePyP complexes.

To make multilayer optical limiter 22, a spin-coated surface layer 24 of chitosan is coated over a silicon or glass substrate 26. Chitosan surface layer 24 has a natural positive charge such that a layer of negatively charged sulfonated $C_{60}$ or copper (II) phthalocyanine ("CuPc") will attach to the positively charged chitosan surface through a dipping process. The sulfonated $C_{60}$ is chemically modified by conventional techniques to have a negative charge. TMePyP, which has an inherent positive electrostatic charge, will then attach to the negatively charged $C_{60}$ or CuPc, creating a third layer. This process can be repeated to generate a multilayer film of any number of layers. The absorbance of the resulting film at desirable specific frequencies increases with the number of layers. A particular advantage of chitosan as the base layer for this type of multilayer optical limiter is that it can have an inherent positive charge and is more optically clear than prior art materials.

A prior art description of this electrostatic self-assembly method not using chitosan is in Thomas M. Cooper, et al., "Formation of Polypeptide-dye Multilayers by an Electrostatic Self-assembly Technique," *Lanigmuir*, vol. 11, pp. 2713–2718 (1995), which is incorporated by reference into this description.

The disclosed chitosan-based electro-optic elements successfully demonstrate the advantages of using chitosan for such elements. Although the disclosed invention is specialized, its teachings will find application in other areas where chitosan may find valuable application.

Those with skill in the art of the invention will readily see various other modifications than those disclosed to the disclosed optical elements. It is understood, therefore, that other modifications to the invention may be made, as might occur to one with skill in the field of this invention, within the scope of the appended claims. All embodiments contemplated have not been shown in complete detail. Other embodiments may be developed without departing from the spirit of this invention or from the scope of the claims.

We claim:

1. An electro-optical apparatus, comprising:
   (a) a substrate; and,
   (b) a rare-earth metal ion doped chitosan-acetic acid film over the substrate.

2. An optical limiter, comprising:
   (a) a chitosan host material; and,
   (b) a photo-interactive dopant inside the chitosan host material.

3. An optical limiter, comprising:
   (a) a chitosan gel host material; and,
   (b) a photo-interactive dopant inside the chitosan gel host material.

4. The optical limiter according to claim 3, wherein the chitosan gel host material comprises a chitosan/acetic anhydride gel.

5. The optical limiter according to claim 3, wherein the chitosan gel host material comprises a chitosan/glutaraldhyde gel.

6. The optical limiter according to claim 3, wherein the chitosan gel host material comprises an acrylate/chitosan system.

7. The optical limiter according to claim 3, wherein the photo-interactive dopant comprises tetramethyl pyridinyl porphyrin.

8. The optical limiter according to claim 3, wherein the photo-interactive dopant comprises a water soluble Zn-octabromotetraphenyl porphyrin.

9. The optical limiter according to claim 3, wherein the photo-interactive dopant comprises copper (II) phthalocyanine tetrasulfonic acid, tetrasodium salt.

10. An optical limiter, comprising:
   (a) a substrate;
   (b) a chitosan layer over the substrate;
   (c) a first negatively charged layer over the chitosan layer; and,
   (d) a first positively charged layer over the first negatively charged layer.

11. The optical limiter according to claim 10, further comprising a plurality of successive layers of alternating positively charged layers and negatively charged layers over the first negatively charged layer.

12. The optical limiter according to claim 10, wherein:
   (a) the first negatively charged layer is a layer of sulfonated $C_{60}$; and,
   (b) the first positively charged layer is a layer of tetramethyl pyridinyl porphyrin.

13. The optical limiter according to claim 12, further comprising a plurality of successive layers of alternating sulfonated $C_{60}$ and tetramethyl pyridinyl porphyrin over the first layer of tetramethyl pyridinyl porphyrin.

14. The optical limiter according to claim 10, wherein:
   (a) the first negatively charged layer is a layer of copper (II) phthalocyanine; and,
   (b) the first positively charged layer is a layer of tetramethyl pyridinyl porphyrin.

15. The optical limiter according to claim 14, further comprising a plurality of successive layers of alternating copper (II) phthalocyanine and tetramethyl pyridinyl porphyrin over the first layer of tetramethyl pyridinyl porphyrin.

16. A method for making an electro-optic apparatus, comprising the steps of:
   (a) providing a substrate; and,
   (b) coating the substrate with a chitosan-acetic acid film doped with rare-earth metal ions.

17. A method for making an optical limiter, comprising the steps of:
   (a) providing a chitosan host material; and,
   (b) doping the chitosan host material with a photo-interactive dopant.

18. A method for making an optical limiter, comprising the steps of:
   (a) providing a chitosan gel host material; and,
   (b) doping the chitosan gel host material with a photo-interactive dopant.

19. The method for making an optical limiter according to claim 18, wherein the chitosan gel host material comprises a chitosan/acetic anhydride gel.

20. The method for making an optical limiter according to claim 18, wherein the chitosan gel host material comprises a chitosan/glutaraldhyde gel.

21. The method for making an optical limiter according to claim 18, wherein the chitosan gel host material comprises an acrylate/chitosan system.

22. The method for making an optical limiter according to claim 18, wherein the photo-interactive dopant comprises tetramethyl pyridinyl porphyrin.

23. The method for making an optical limiter according to claim 18, wherein the photo-interactive dopant comprises a water soluble Zn-octabromotetraphenyl porphyrin.

24. The method for making an optical limiter according to claim 18, wherein the photo-interactive dopant comprises copper (II) phthalocyaninetetrasulfonic acid, tetrasodium salt.

25. A method for making an optical limiter, comprising the steps of:
   (a) providing a substrate;
   (b) coating the substrate with layer of chitosan;
   (c) electrostatically coating the chitosan layer with a first negatively charged layer; and,
   (d) electrostatically coating the first negatively charged layer with a first positively charged layer.

26. A method for making an optical limiter according to claim 25, further comprising the steps of electrostatically applying a plurality of successive layers of alternating positively charged layers and negatively charged layers over the first negatively charged layer.

27. The method for making an optical limiter according to claim 25, wherein:
   (a) the first negatively charged layer is a layer of sulfonated $C_{60}$; and,
   (b) the first positively charged layer is a layer of tetramethyl pyridinyl porphyrin.

28. The method for making an optical limiter according to claim 27, further comprising the steps of electrostatically applying a plurality of successive layers of alternating sulfonated $C_{60}$ and tetramethyl pyridinyl porphyrin over the first layer of tetramethyl pyridinyl porphyrin.

29. The method for making an optical limiter according to claim 25, wherein:
   (a) the first negatively charged layer is a layer of copper (II) phthalocyanine; and,
   (b) the first positively charged layer is a layer of tetramethyl pyridinyl porphyrin.

30. The method for making an optical limiter according to claim 29, further comprising the steps of electrostatically applying a plurality of successive layers of alternating copper (II) phthalocyanine and tetramethyl pyridinyl porphyrin over the first layer of tetramethyl pyridinyl porphyrin.

31. A method for limiting the transmission of a beam of electromagnetic energy comprising intercepting the beam by a chitosan host material having a photo-interactive dopant inside the chitosan host material.

32. A method for limiting the transmission of a beam of electromagnetic energy comprising intercepting the beam by a chitosan gel host material having a photo-interactive dopant inside the chitosan gel host material.

33. A method for limiting the transmission of a beam of electromagnetic energy comprising intercepting the beam by an optical limiter comprising:
   (a) a substrate;
   (b) a chitosan layer over the substrate;
   (c) a first negatively charged layer over the chitosan layer; and,
   (d) a first positively charged layer over the first negatively charged layer.

* * * * *